United States Patent [19]

Broxmeyer

[11] Patent Number: 4,965,583
[45] Date of Patent: Oct. 23, 1990

[54] COLLISION AVOIDANCE SYSTEM FOR AUTOMATICALLY CONTROLLED VEHICLES MOVING AT SHORT HEADWAYS

[76] Inventor: Charles Broxmeyer, 6851 Strata St., McLean, Va. 22101

[21] Appl. No.: 346,582

[22] Filed: May 2, 1989

[51] Int. Cl.⁵ .................. G01S 13/76; B61L 23/34
[52] U.S. Cl. ........................... 342/42; 246/167 D
[58] Field of Search ............ 342/42, 71; 246/187 C, 246/30, 167 D

[56] References Cited

U.S. PATENT DOCUMENTS

| | | | |
|---|---|---|---|
| 2,702,342 | 2/1955 | Korman | 246/30 |
| 3,309,516 | 3/1967 | Baughman | 246/34 R |
| 3,361,905 | 1/1968 | Baughman | 246/187.6 |
| 3,891,168 | 6/1975 | Kraus | 246/187.6 X |
| 4,166,599 | 9/1979 | Auer, Jr. et al. | 246/63 A |

*Primary Examiner*—Gilberto Barron, Jr.

[57] ABSTRACT

Safe separation distances between automatically controlled vehicles moving at short headways on a guideway are maintained through the cooperative action of a block control system and reflectometer (radar) and transponder (beacon) intervehicle distance measuring equipment installed in vehicles. A reflectometer determines distance to a leading vehicle through measurement of the delay between a transmitted signal and a received signal relayed by a transponder in the leading vehicle. A transmission line acts as the medium of transmission. Problems associated with non-transponder-equipped reflectometers are obviated. In the event of transponder malfunction, the block control system maintains backup safety regardless of transponder activity in other vehicles. Exessively short block lengths generally required for short-headway maintenance by block control systems are not required. Merge protection is effected through the cooperative action of the block control system and stationary reflectometers, installed at the wayside, which measure distances to merging vehicles through interaction with transponders located in the vehicles.

11 Claims, 8 Drawing Sheets

COLLISION AVOIDANCE SYSTEM FOR AUTOMATICALLY CONTROLLED VEHICLES MOVING AT SHORT HEADWAYS

BACKGROUND OF THE INVENTION

1. Field of the Invention

This invention relates to means for preventing collisions between automatically controlled vehicles (or trains) operating on a guideway (or track).

2. Description of the Prior Art

The traditional and universally used means for preventing collisions between vehicles operating on a guideway is the block control system. Such a system acts to command an appropriate speed reduction in a vehicle which approaches too closely to another vehicle ahead of it on the guideway.

A block control system divides the guideway into contiguous zones called blocks. When a vehicle enters a block, the block is said to be occupied and the block is instrumented to register such occupation. Instrumentation causes a vehicle entering specified blocks behind an occupied block to receive "slow-down" or "stop" commands to insure that a collision between leading and trailing vehicles does not occur.

The advent of "people mover" or "personal rapid transit" systems, in which automatically controlled vehicles operate with nominal time separations (headways) much shorter than those of traditional rapid rail transit trains, has resulted in departures from traditional block control means for preventing vehicle collisions. For very short headways, several seconds or less in length (as contrasted with rapid rail headways which generally exceed one minute), block control systems require very large numbers of blocks per unit length of guideway. Since each block has an irreducible complement of hardware components, a control system for a very-short headway transit system would be inordinately complex and expensive.

To avoid the difficulties inherent in application of block control to vehicles moving at very-short headways, development activity for collision avoidance systems applicable to such vehicles has been concentrated on accurate measurement of intervehicle distance. Safe vehicle separation is assured by initiating emergency braking when measured intervehicle distance is less than some predetermined threshold. One such means of intervehicle distance measurement involves the use of radar techniques wherein a high-frequency electromagnetic signal transmitted from a trailing vehicle is reflected from a leading vehicle, and the intervehicle distance is inferred from the measured delay between the transmitted signal and the reflected signal received in the trailing vehicle. However such radar means for measuring distance have not been successful for reasons as detailed hereinafter.

Excessive Number of Blocks per Unit Length of Guideway in Short Headway Applications Inasmuch as block control systems have the inherent disadvantage of requiring extremely short block lengths when applied to short headway transit systems, and since it is an object of this invention to overcome such disadvantage, the circumstances leading to extremely short block lengths are illustrated herein.

Collision avoidance systems function, with respect to a specified direction of travel, by creating, behind each vehicle, a "zone of exclusion" applying to a trailing vehicle. If a trailing vehicle enters the zone of exclusion of a leading vehicle, the emergency braking system of the trailing vehicle is activated and the vehicle comes to a stop. The length of the zone of exclusion is such that the trailing vehicle will not collide with the leading vehicle even if the leading vehicle stops suddenly as if hitting a brick wall. Ideally, in a short headway transit system, the length of the zone of exclusion is as short as possible consistent with reasonable emergency braking rate.

A block control system produces a variable-length zone of exclusion. Unless the blocks are made very small, the zone of exclusion is, at times, substantially longer than is necessary to ensure safety. As a vehicle proceeds along the guideway, the trailing edge of its zone of exclusion jumps forward one block length each time the vehicle enters a new block. When a vehicle penetrates a new block, the block entered is designated an occupied block and the immediately preceding block is designated an unsafe-to-proceed block. When the vehicle penetrates the next downstream block, the unsafe-to-proceed block is cleared for vehicle operation and the occupied block becomes an unsafe-to-proceed block. A trailing vehicle that enters an unsafe-to-proceed block is commanded to stop.

The zone of exclusion has a minimum length $L_b - L_v$, where $L_b$ is block length and $L_v$ is vehicle length, just after block penetration. The distance $L_b - L_v$ is generally the stopping distance of a vehicle under emergency stopping conditions. The zone of exclusion reaches its maximum length $2L_b - L_v$ just before the succeeding block is penetrated. When two vehicles travel at the same speed, they must be separated by a distance greater than the maximum length of the zone of exclusion to insure that the brakes of the trailing vehicle are not activated. Thus a block control system, as described, would provide a minimum vehicle separation one block longer than vehicle stopping distance under emergency braking conditions.

Headway, the time separation between corresponding points of two vehicles moving on the guideway, is the usual operational measure of vehicle separation. For the case under consideration, the minimum operational separation distance between corresponding points of two moving vehicles is the maximum length of the zone of exclusion plus vehicle length. Accordingly, the minimum headway $h_{min}$ that is achievable under block control, as defined, is $$h_{min} = \frac{2L_b}{V}$$

where V is vehicle speed. This is twice the headway that could be realized with a minimum-length zone of exclusion.

The minimum headway can be reduced by dividing block length by an integer n while insuring that the length of the zone of exclusion does not decrease below $L_b - L_v$. For example let the blocks be subdivided into n smaller blocks of length $L_{bn}$ so that $$L_b = nL_{bn}$$

and let n contiguous blocks be designated unsafe-to-proceed blocks. The minimum length of the zone of exclusion, $nL_{bn} - L_v$, is reached just after penetration of a block by the vehicle. As the vehicle traverses the occupied block of length $L_{bn}$, the length of the zone of exclusion grows to a maximum $(n+1)L_{bn}-L_v$. Thus the minimum headway is $$h_{min} = \frac{(n+1)L_{bn}}{V} = \frac{(n+1)}{n} \frac{L_b}{V}$$

In a typical example, a vehicle moving at 20 mph (29.33 ft/sec) has a stopping distance under emergency braking conditions of less than 72 ft. If the vehicle length is 16 ft, a block length of 88 ft will provide a safe zone of exclusion. In this case the minimum headway is $$h_{min} = \frac{2L_b}{V} = 6 \text{ sec}$$

If block length is halved $$h_{min} = \frac{3L_b}{2V} = 4.5 \text{ sec}$$

whereas if block length is reduced by a factor of 40, to a length of 2.2 ft $$h_{min} = \frac{41L_b}{40V} = 3.075 \text{ sec}$$

Thus an operating headway in the neighborhood of 3 sec can be approached with a block control system but will require extremely short block lengths of the order of several feet.

Reflectometer Collision Avoidance Systems

It has been shown that block control systems are unsuitable for preventing collisions between vehicles when minimum operating headways are in the range of several seconds or less. Among the alternative means investigated for maintaining safe separation distances between vehicles moving at very short headways are devices called reflectometers which operate on a radar principle.

A reflectometer generates and transmits a high-frequency electromagnetic signal, modulated by a pulse train, which is coupled from a vehicle in which the reflectometer is mounted into a waveguide transmission line which is installed parallel to the guideway. The coupler has a directional property which insures that the bulk of the signal energy travels in the direction of travel of the vehicle. The signal travels along the waveguide and a portion of the signal energy is coupled into another vehicle where it encounters a reflector. A reflected signal is directionally coupled back into the waveguide and travels along the guideway in the direction of the transmitting vehicle. When the reflected signal encounters the coupler of the reflectometer, a portion of the energy is coupled into a receiver in the reflectometer. The received signal is amplified and processed in a manner equivalent to the processing of a received signal in a range-tracking radar system, and the elapsed time between transmission of a pulse and receipt of its reflection is determined. The distance between the two vehicles is inferred from the elapsed time measurement. If the distance between the vehicles is less than a specified safe separation distance, the trailing vehicle is commanded to stop.

The reflectometer system described above is a special form of radar system and utilizes standard radar system design, components, transmitter/receiver technology and automatic range-tracking means. The reflectometer differs from a radar in that the medium of transmission is a waveguide, with associated coupling means, rather than free space.

Substantial development activity has been invested in the development of a practicable reflectometer system. However problems associated with the waveguide transmission medium prevented accurate, reliable, unambiguous determination of intervehicle distance and a useful reflectometer system was not achieved. Among the development problems encountered were the following:

Reflections from transmission line expansion joints were indistinguishable from target reflections.

Complex mechanical structures were required to hold the couplers in precise alignment with the transmission line.

Multiple reflections among targets led to false target indications and obscured the positions of actual targets.

Use of Transponders with Reflectometer System

It has been conjectured that a practicable reflectometer system could be obtained by replacing the reflector on the leading vehicle with a transponder. The transponder (sometimes also called a beacon) is a device that receives a transmitted signal and transmits a new signal in synchronism with the received signal. The frequency of the signal transmitted by the transponder would be different from the frequency of the signal transmitted by the reflectometer. Furthermore the transponder would not receive at the transponder transmit frequency.

Receipt of transponder signals in a reflectometer would result in accurate determination of distance between the reflectometer and transponder through determination of elapsed time between transmitted and received pulses.

The signal strength of the transponder signals and the change in frequency between generated and received signals would eliminate problems resulting from reflections from waveguide expansion joints and from multiple reflections between targets. Furthermore, coupler design would be less critical than in the case of a reflected return signal.

It has been objected however that a transponder-equipped reflectometer system of the type described would not guarantee safety against collisions, since safety would be dependent on effective operation of the transponder. In the event of a transponder failure, a leading vehicle would be invisible to a trailing vehicle and a collision could result.

Objects of the Invention

It is an object of this invention to provide safe, reliable, cost effective means of preventing collisions between automatically controlled vehicles moving at short headways on a guideway.

It is another object of this invention to allow use of block control systems for collision avoidance of closely spaced vehicles without requiring that such block control systems implement excessively and impracticably short block lengths.

It is another object of this invention to make possible the use of radar range measurement techniques, for collision avoidance of closely spaced vehicles, by providing an alternative arrangement which overcomes problems which have heretofore prevented successful implementation of such techniques.

It is a further object of this invention to provide a collision avoidance system, for closely spaced vehicles operating on a guideway, wherein a block control system, and an intervehicle distance measuring system based on radar range measurement techniques, function as subsystems of a combined system in which the capabilities of the component subsystems complement each other - and the disadvantages of these subsystems as means of protection against collision are negated.

SUMMARY OF THE INVENTION

This invention comprises a block control system combined with and acting cooperatively with a transponder-equipped reflectometer system.

Vehicle Follower Protection

The transponder-equipped reflectometer system comprises a plurality of reflectometers, each mounted in a vehicle that is constrained to operate on a guideway; means within each reflectometer for generating a high-frequency electromagnetic signal; a waveguide transmission line mounted parallel to the guideway, which provides a medium of transmission for reflectometer-generated electromagnetic signals; couplers for directionally transferring signals from the reflectometers to the waveguide and vice versa; a plurality of transponders, each mounted in a vehicle, with capability for receiving transmitted signals from trailing vehicles and transmitting new signals back to the trailing vehicles in synchronism with, but at a different frequency from, the received signals; couplers for transferring signals from the waveguide to the transponders and vice versa; means within each reflectometer for receiving transponder-generated signals and for measuring the time delay between a transmitted signal and the corresponding signal received from the transponder. The reflectometer-transponder combinations are capable of generating, within each vehicle, an accurate measure of the distance to the nearest leading vehicle on the guideway, based on the elapsed time measurement, provided that the leading vehicle is within a maximum range limitation.

The block control system comprises a sequence of inductive loops, each spanning a segment of guideway called a block and controlled through the action of wayside logic circuits that operate on input information from magnetically activated switches located at the block boundaries. Each block has a status that is sensed inductively by equipment in vehicles passing over the block. Safe-to-proceed status is communicated by activating a block loop antenna at a specified frequency. Unsafe-to-proceed block status is communicated passively by leaving the block loop antenna unactivated. Under normal block control, unsafe-to-proceed status in a given block results in a stopping command to any vehicle occupying the block; however this requirement is modified for a block control system functioning as a subsystem of this invention The block control system, and the reflectometer-transponder distance measuring equipment, are capable of acting independently to maintain safe separation distances between vehicles moving on the guideway. Cooperative action of these equipments is effected through special-purpose computers called collision avoidance controllers, located in each vehicle, which control braking and are capable of revoking the action of the block control system. When a reflectometer in a given vehicle obtains valid intervehicle distance measurements, in cooperation with the transponder in the vehicle ahead, the collision avoidance controller, acting through the vehicle control system, insures that vehicle brakes are applied if the measured distance between the two vehicles drops below the minimum safe separation distance. Simultaneously, so long as valid intervehicle distance information is available, and so long as certain other conditions are satisfied, as noted below, the collision avoidance controller revokes braking action that would occur as a result of block control system operation. When the reflectometer does not obtain valid intervehicle distance measurements, moving to transponder or other equipment malfunction, the collision avoidance controller does not revoke the action of the block control system.

The purpose of the block control system, in this invention, is to act as a backup system to the reflectometer-transponder system in the event of reflectometer-transponder malfunction. Accordingly the block control system need not implement short block lengths commensurate with short headway maintenance through block control means.

The following system constraints provide for safe transition to block control in the event of transponder malfunction:

Block length is selected so that, under minimum operating headway conditions, a leading vehicle shall have departed from a block before the block is entered by a trailing vehicle. Accordingly, a block would not normally be occupied by two vehicles; however such occupation is possible under an emergency braking or other abnormal condition.

In the event that two vehicles occupy the same block, the unsafe-to-proceed condition imposed on the preceding block is nonrevocable by the collision avoidance controller and an unsafe-to-proceed condition is imposed on the jointly occupied block.

In the event that measured distance from the trailing vehicle to the nearest leading vehicle is greater than $2L_b-L_v$, an unsafe-to-proceed condition encountered by the trailing vehicle is not revoked.

The above conditions comprise a safeguard against collision with a vehicle having a malfunctioning or inoperative transponder. In a situation in which a leading vehicle is noncommunicating with respect to transponder operation, and occupies a block jointly with a leading vehicle that is communicating with respect to transponder operation, a safe condition prevails with respect to an overtaking vehicle, since the block preceding the occupied block has nonrevocable unsafe-to-proceed status.

In a situation in which a communicating vehicle is in the next downstream block from a block occupied by a noncommunicating vehicle, the measured distance from an overtaking vehicle to the communicating vehicle, when the overtaking vehicle encounters the unsafe-to-proceed condition imposed on the preceding block by the noncommunicating vehicle, is greater than $2L_b-L_v$. This distance is inconsistent with a causal relationship between the communicating vehicle and the presence of the unsafe-to-proceed block at the point encountered. Accordingly, the presence of a noncommunicating vehicle as the cause of the unsafe-to-proceed condition is disclosed and the unsafe-to-proceed condition is not revoked.

In a non-overtake situation, wherein members of a group of vehicles are travelling at the minimum headway, and the transponder of one of the vehicles fails, the distance between the vehicle trailing the noncommunicating vehicle and the vehicle leading the noncommunicating vehicle is greater than $2L_b-L_y$. Accordingly, if the vehicle trailing the noncommunicating vehicle is in an unsafe-to-proceed block, it will be commanded to stop. If it is not in an unsafe-to-proceed block, it will be commanded to stop when an unsafe-to-proceed block is reached.

In startup situations, vehicles may be parked initially in adjacent blocks. In such a situation a noncommunicating vehicle will not be initially detected if the vehicle immediately preceding, and the vehicle immediately following, the noncommunicating vehicle are separated by a distance less than $2L_b-L_y$. The collision avoidance controller assures safety in such a situation by preventing a stopped vehicle from starting until its measured distance to the next downstream communicating vehicle is greater than $2L_b-L_y$. When the measured distance from a stopped vehicle to a downstream vehicle exceeds $2L_b-L_y$, and the block occupied by the stopped vehicle is subject to an unsafe-to-proceed condition, the possible causes of the condition are a noncommunicating, leading vehicle in the same block, a trailing vehicle in the same block, or a noncommunicating vehicle in the next downstream block. In this situation the stopped vehicle will not start since a leading vehicle has not been identified as the cause of the unsafe-to-proceed condition. When vehicles are stopped as a result of joint vehicle occupancy of a block, intervention from a central control facility is necessary to restart and remove the vehicles.

Merge Protection

The prior discussion of the features of this invention pertains to situations in which vehicles are protected against collision with other vehicles in the same guideway lane. The invention also provides collision protection in situations in which streams of vehicles merge when entering a guideway lane from separate branches.

At merge junctions, stationary reflectometers, mounted at the wayside in the vicinity of the merge junction, measure the distances to all incoming vehicles within a specified distance, on both branches of the junction. A separate reflectometer is required for each branch. The reflectometers operate cooperatively with transponders in the incoming vehicles. The branches of the merge junction are also protected by a block control system designed to insure that merging vehicles do not collide.

The merge junction is further protected by a special-purpose computer called a merge controller which accepts measured distance information to incoming vehicles from the wayside reflectometers, and block occupancy information from the block control system, and controls the safe-to-proceed/unsafe-to-proceed status of blocks in the merge region. Unsafe-to-proceed conditions imposed by the merge controllers are generally nonrevocable by on-board collision avoidance controllers to prevent revocation based on intervehicle distance criteria for vehicles within the same stream.

Thus merge control differs from on-board control in that all measurements and decision operations pertaining to the safety of merging are made by stationary equipment installed at the wayside.

When the difference in the distances to the nearest incoming vehicles on both branches of the merge junction is less than the minimum safe headway, an unsafe-to-proceed condition is imposed on an appropriate block to insure that the merging vehicles do not collide. When the difference between the distances is greater than the safe headway, no unsafe-to-proceed condition is imposed except as necessary to protect the vehicles from collision with other vehicles in the same stream.

Vehicles that are noncommunicating with respect to transponder operation are identified by the merge controller based on block occupancy and measured distance information. For example, when the block control system registers the presence of a vehicle within a block and the presence of such vehicle is not verified by a wayside reflectometer, the presence of a noncommunicating vehicle is inferred. Likewise, when the block control system registers the presence of two vehicles within a block, and the presence of only one vehicle is verified by the reflectometer-transponder system, the presence of a noncommunicating vehicle is inferred. In such situations, the merge controller imposes unsafe-to-proceed conditions on appropriate blocks as necessary to prevent collision.

The above situations as well as all other potential merge conflict situations are acted upon by the merge controller, which insures safe merging of vehicles as well as uninterrupted flow of vehicles through the merge junction.

DESCRIPTION OF THE PREFERRED EMBODIMENT

This invention has two major protective aspects-protection against collision between neighboring vehicles travelling in a lane of guideway and protection against collision between vehicles merging into a lane of guideway from separate branches. These aspects are addressed by distinctive arrangements of components.

Vehicle Follower Protection

Figure 1:
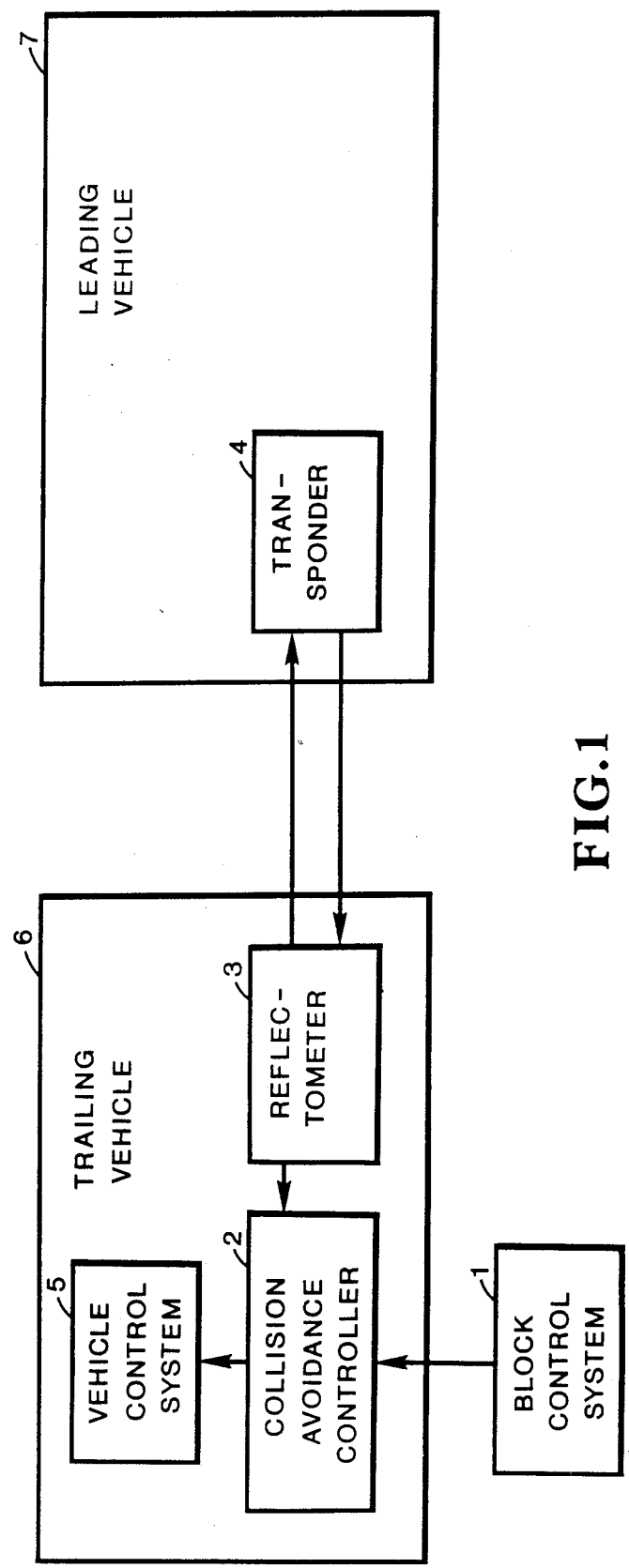
FIG. 1 is a block diagram illustrating the major elements of the invention as they apply to protection against collision between vehicles travelling on a lane of guideway.

Referring to FIG. 1, block control system 1 inductively transmits block safety status to collision avoidance controller 2 located in trailing vehicle 6. Three block status conditions are possible as follows: safe-to-proceed, unsafe-to-proceed (revocable) and unsafe-to-proceed (nonrevocable). At the same time, reflectometer 3, functioning cooperatively with transponder 4 located in leading vehicle 7, determines intervehicle distance and transmits this measurement to collision avoidance controller 2.

Figure 2:
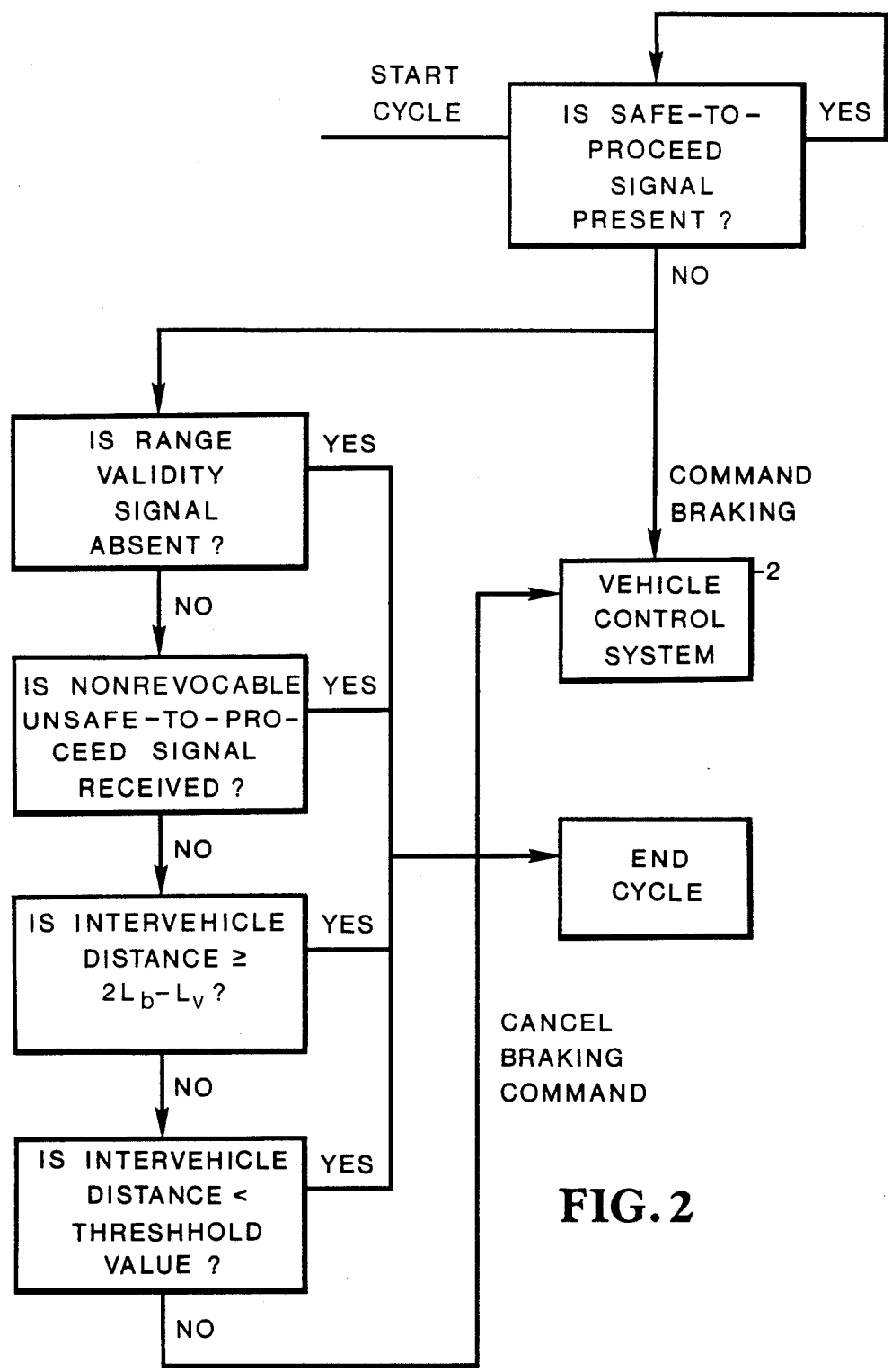
FIG. 2 is a flow diagram illustrating the checking and decision operations performed by the collision avoidance controller.

Collision avoidance controller 2 performs a sequence of operations on the inputs from block control system 1 and reflectometer 3 and develops input commands for vehicle control system 5. The sequence of operations is shown in FIG. 2. This sequence is repeated several times each second.

Initially, the collision avoidance controller checks for the presence of a safe-to-proceed signal. If affirmative, the check is repeated until such time as the safe-to-proceed signal is not present. In the latter event, vehicle control system 5 is commanded to activate the vehicle emergency braking system. The braking action is cancellable provided a cancel braking command is received by the vehicle control system within a specified time period measured from the braking command. The following four determinations are made in sequence:

Is range validity signal absent?
Has a nonrevocable unsafe-to-proceed signal been received?
Is intervehicle distance greater than or equal to twice block length less vehicle length?
Is intervehicle distance less than vehicle stopping distance under emergency braking conditions?

If the result of any checking operation is affirmative, the sequence is interrupted and braking is allowed to proceed. If the result of a checking operation is negative, the next sequential check is made. If the results of all checking operations are negative, vehicle braking is cancelled.

Figure 3:
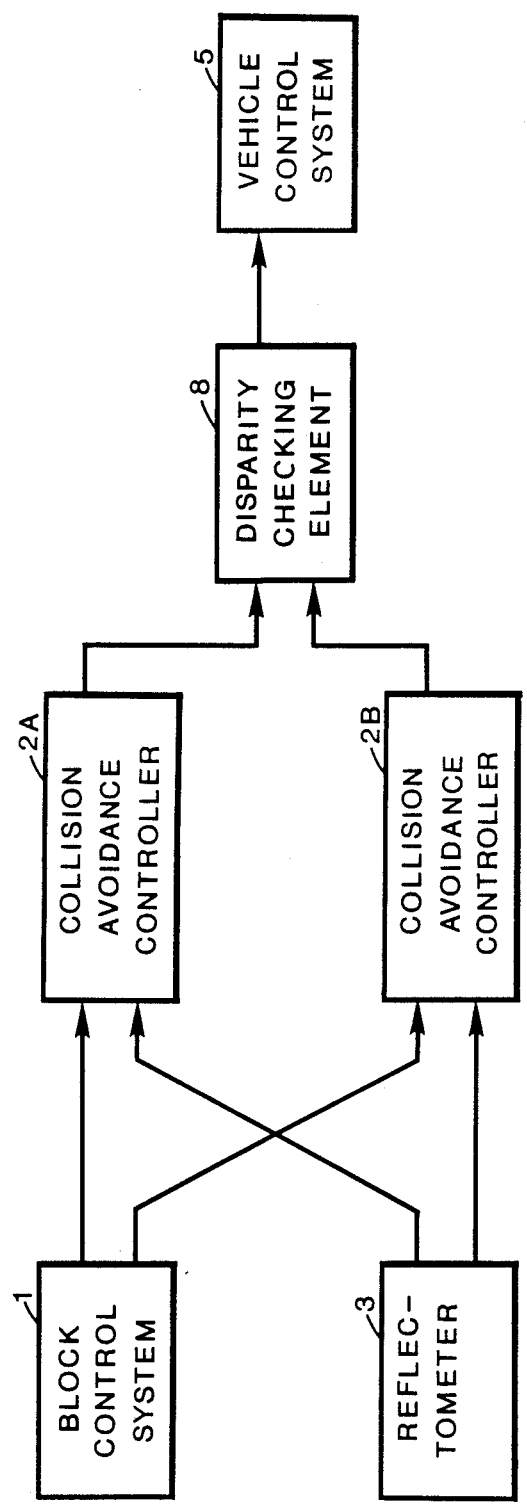
FIG. 3 illustrates an application of parallel redundant collision avoidance controllers.
Figure 4:
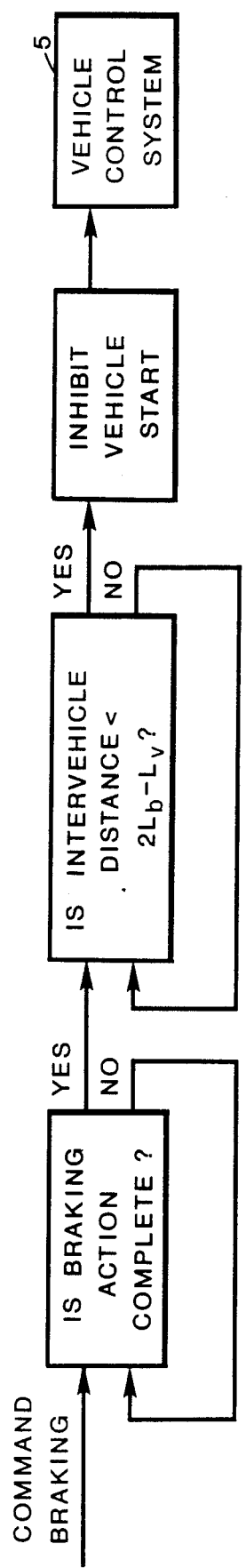
FIG. 4 is a flow diagram illustrating the checking and decision operations performed by the collision avoidance controller with respect to startup of a stopped vehicle.

For maximum safety, collision avoidance controller 2 is implemented as a hardwired special-purpose computer. As an option of this invention, leading to additional safety, redundant, parallel collision avoidance controllers 2A and 2B can be implemented as shown in FIG. 3. When the outputs of collision avoidance controllers 2A and 2B fail to agree, as determined by disparity checking element 8, the more conservative course is adopted. Braking is commanded if at least one controller commands braking. Braking is cancelled only if both controllers command cancellation Collision avoidance controller 2 performs a parallel checking operation, illustrated in FIG. 4, to inhibit startup of a stopped vehicle when the measured distance from the stopped vehicle to a leading vehicle is less than twice block length less vehicle length.

The block control system element of this invention utilizes nonconductive block occupancy registration means. Rail block control systems rely on conduction of electric current through wheels and axles of cars for registration of block occupancy. Automated personal rapid transit or people mover systems generally do not employ steel wheel on steel rail propulsion/suspension systems. In some cases, vehicles are suspended magnetically from an overhead guideway. In other cases, vehicles are supported above a guideway through air cushion means. In still other cases, vehicles are supported and propelled by rubber-tired wheels. When such propulsion/suspension means are employed, conductive block occupancy means are not applicable.

Block control systems utilizing nonconductive block occupancy means have been developed and represent a well-established art. Nonconductive block occupancy registration is used, for example, in the people mover system in Morgantown, W.V. and is described in *Morgantown People Mover Collision Avoidance System Design Summary* by R. J. Schroder and R. S. Washington of the Boeing Aerospace Company (U.S. Urban Mass Transportation Administration Report No. UMTA MA 06-0048-86-9, Sept., 1980). A similar block control system employing nonconductive block occupancy registration means is described by Sibley et. al. in U.S. Pat. No. 3,991,958 "Magnetically Actuated Registration Circuitry for a Vehicle Control System."

Figure 5:
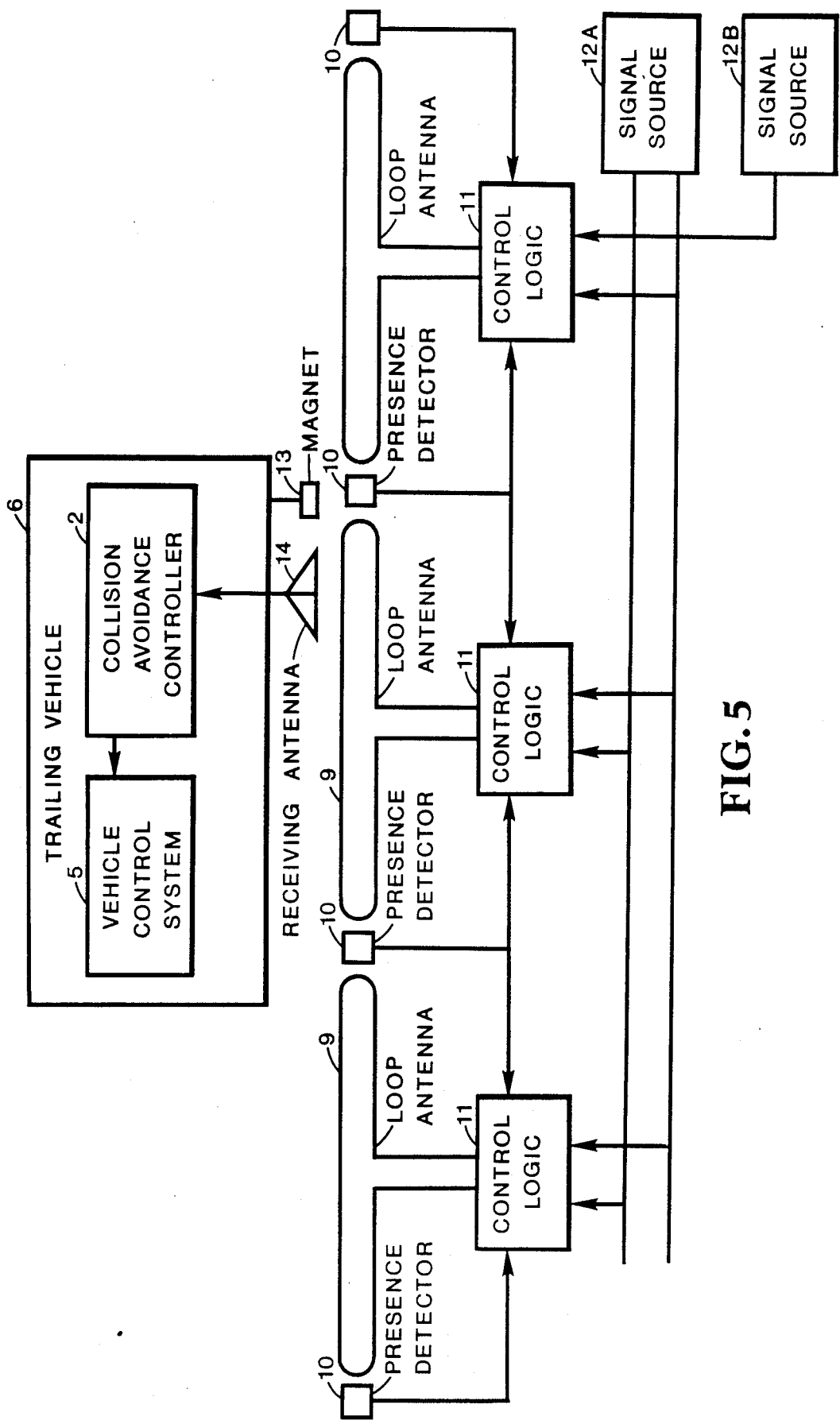
FIG. 5 illustrates the configuration of the block control system.

Referring to FIG. 5, the guideway-mounted portion of the block control system communicates with vehicle 6 through inductive loop antennas 9 which are buried in the guideway just below the vehicle running surface. The loop antennas are elongated, with parallel segments of wire extending the length of each block. Presence detectors 10 are located in the guideway at the block end points. The presence detectors are activated by the proximity of magnet 13 under the forward part of vehicle 6. When a vehicle-mounted magnet passes above a presence detector, the normally open presence detector switch closes. The switch reopens after the magnet has passed. The momentary switch closure allows a current to flow, generating a pulse marking the vehicle passage. Loop antenna control logic circuits 11 control the loop antenna energization states based on inputs from the presence detectors.

The energization states of loop antennas 9 correspond to block status. A loop antenna is energized with a signal at frequency $f_1$, generated by loop antenna signal source 12A, when the sequences of pulses received by loop antenna control logic circuit 11 from presence detectors 10 indicate that the next downstream block is unoccupied. A loop antenna is not energized when the sequences of pulses received by loop antenna control logic circuit 11 indicate that the next downstream block is occupied by one vehicle or that the block spanned by the loop is occupied by more than one vehicle. A loop antenna is energized with a signal at frequency $f_2$, generated by signal source 12B, when the sequences of pulses received by loop antenna control logic circuit 11 indicate that the next downstream block is occupied by more than one vehicle. Accordingly, frequency $f_1$ corresponds to safe-to-proceed status, an unenergized state corresponds to unsafe-to-proceed (revocable) status and a frequency $f_2$ corresponds to unsafe-to-proceed (nonrevocable) status.

A vehicle passing over a loop antenna receives a signal via receiving antenna 14 which is installed under the forward part of the vehicle. The signal is transmitted from the antenna to a receiver located in collision avoidance controller 2. The receiver produces an output indicating which of the three possible loop antenna energization states is present. The collision avoidance controller responds to the receiver output and to the outputs of the reflectometer-transponder system as indicated in FIG. 2.

Figure 6:
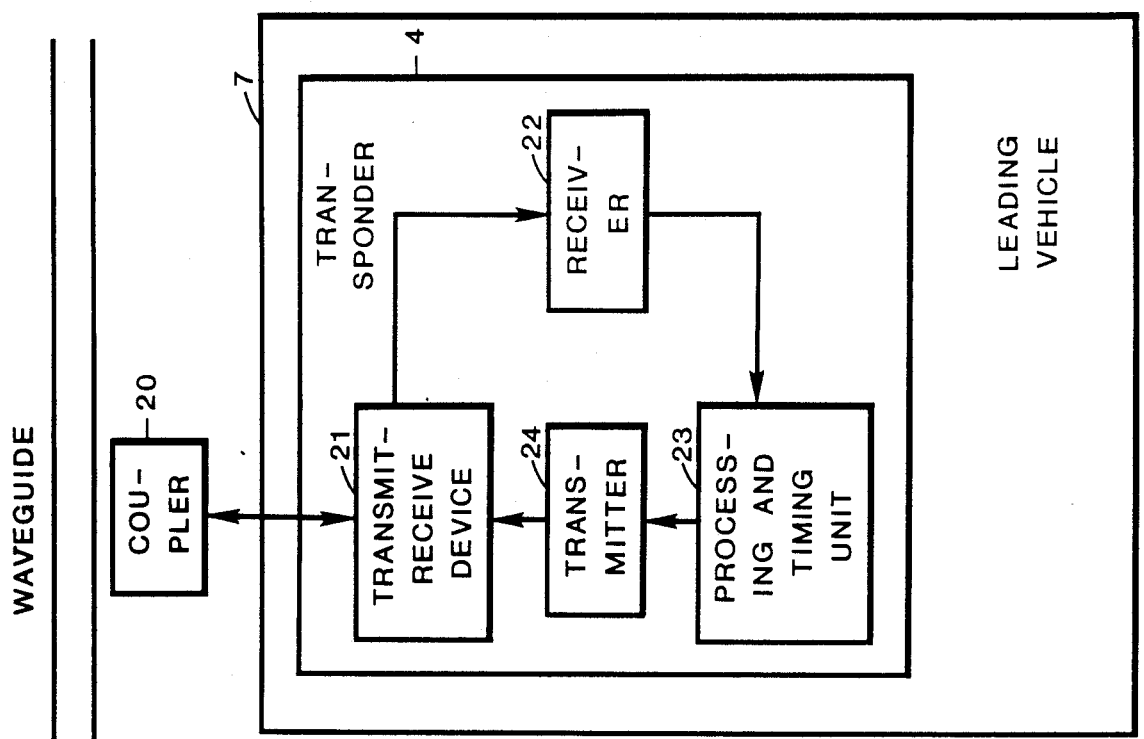
FIG. 6 illustrates the configuration of the on-board reflectometer-transponder system.
Figure 6:
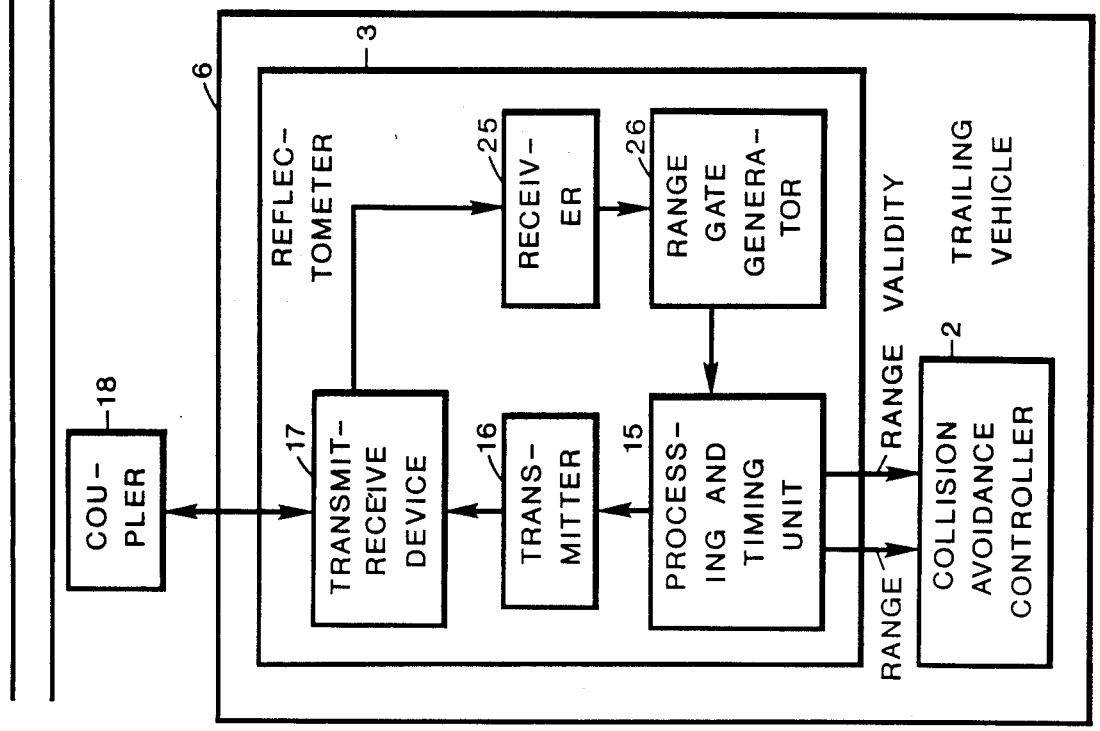

Installed in each vehicle, for the purpose of measuring distance to leading vehicles on the right of way, is a reflectometer which is equivalent in design to a range-tracking radar system. Transmitter 16 located in reflectometer 3, shown in FIG. 6, generates a sequence of high-frequency pulses. Pulse length and spacing is determined by processing and timing unit 15. The transmitted signal passes through transmit receive device 17 which protects reflectometer receiver 25 from receiving the transmitter output. The transmitted signal is directionally coupled into waveguide transmission line 19 by reflectometer coupler 18 which is mounted on the vehicle. The waveguide transmission line is installed along the guideway and is in proximity with reflectometer couplers. The directional property of coupler 18 insures that the bulk of the transmitted energy propagates in the desired downstream direction from the vehicle.

Installed in each vehicle, for the purpose of cooperating with reflectometers in trailing vehicles, is a transponder which receives reflectometer pulses and transmits new pulses in response. When a transmitted electromagnetic signal encounters transponder coupler 20, a portion of the energy in the signal is coupled into transponder receiver 22 via transmit receive device 21 which prevents receiver energy from being diverted to transponder transmitter 24. Receiver 22 amplifies the signal and performs necessary operations to recover the envelope of the originally transmitted signal as delayed by propagation along the waveguide. The recovered signal acts as input to transponder processing and timing element 23 which controls the action of transponder transmitter 24. Transmitter 24 generates a high-frequency pulse in response to each received pulse. A transmitted pulse is delayed by a fixed period from the time of receipt of the corresponding input pulse.

The transmitted transponder pulse is directionally coupled into waveguide 19 via transmit receive device 21 and transponder coupler 20. The bulk of the transponder-generated pulse energy travels back along the waveguide and is coupled into reflectometer 3 via reflectometer coupler 18 and transmit receive device 17. The received signal is amplified by transponder receiver 25 and necessary operations are performed to recover the envelope of the transponder-generated signal. The recovered signal is the input to range gate generator 26 which generates range gates to mark the mid-point of the received signal and determines range in accordance with well-known radar range tracking practice. The outputs of reflectometer 3, received by collision avoidance controller 2 via processing and timing unit 15, are the measured range and a range validity signal which confirms that reflectometer 3 is measuring range to transponder 4.

Merge Protection

Figure 7:
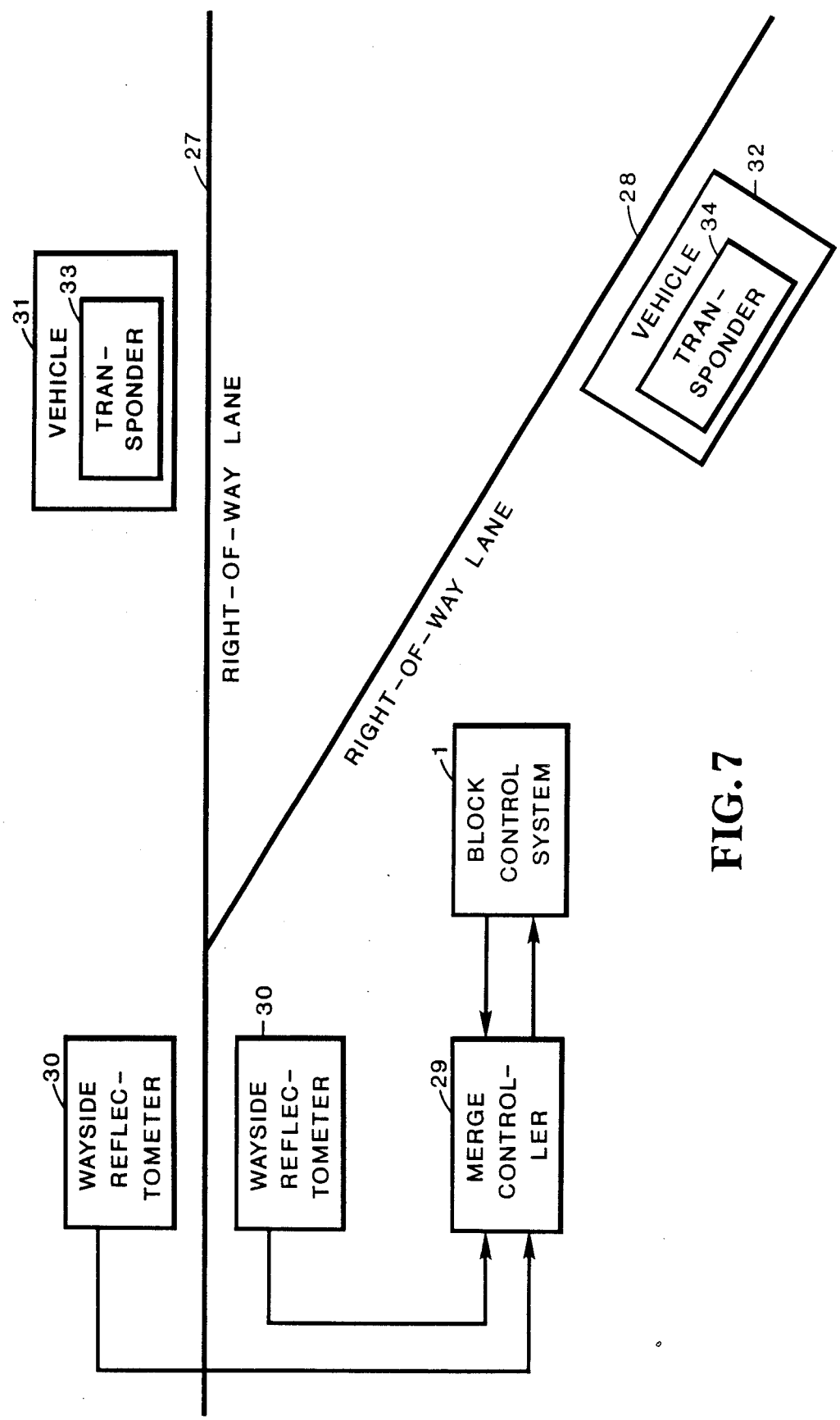
FIG. 7 illustrates, schematically, guideway layout at a merge junction, distance measuring equipment at a merge junction and merging vehicles.
Figure 8:
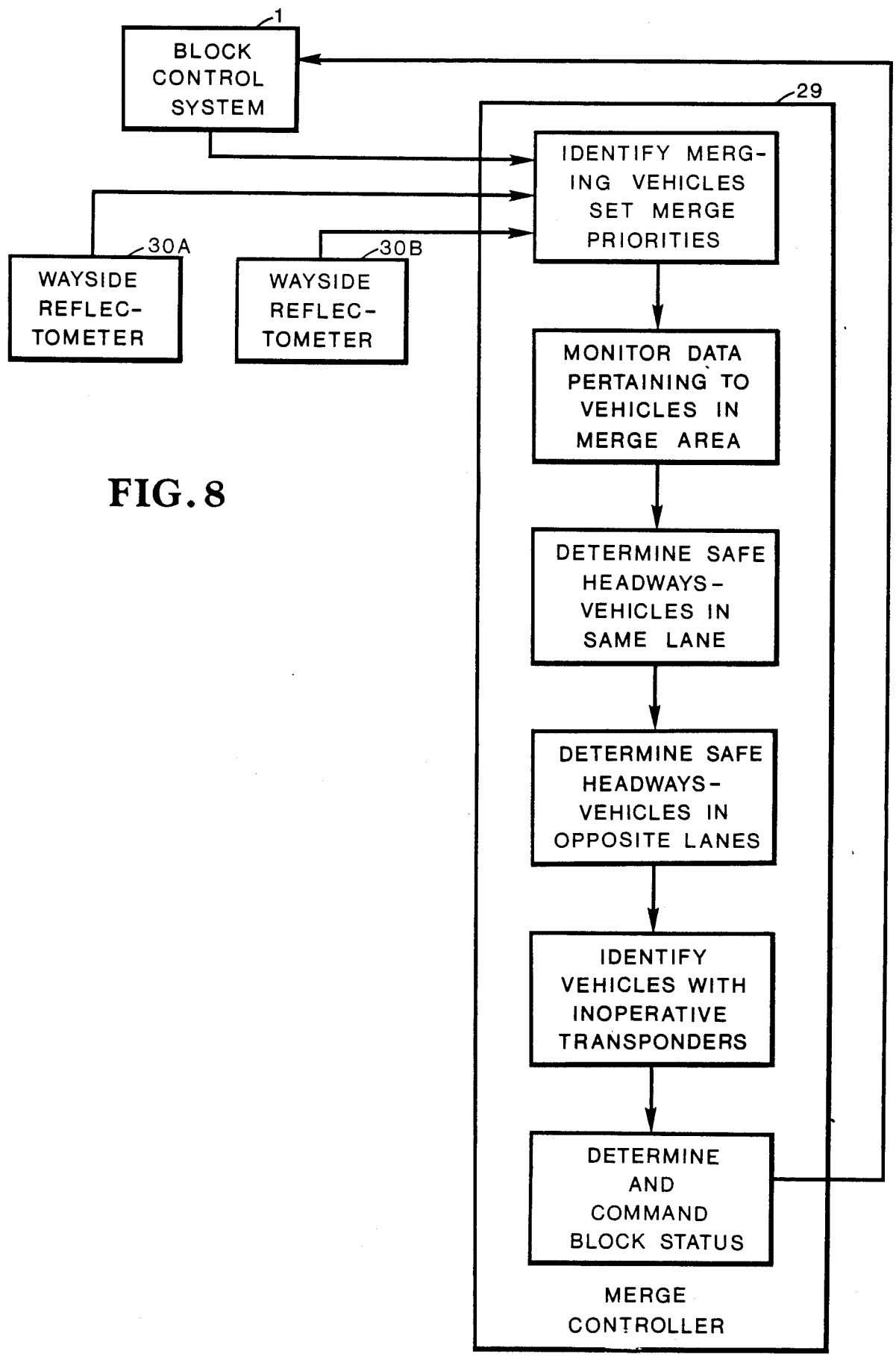
FIG. 8 is a flow diagram illustrating the operations performed by the merge controller.

In merge situations, equipment as indicated in FIG. 7 is employed. Merge controller 29 is a special-purpose computer that controls vehicle collision avoidance functions over defined sections of guideway entering and departing from a merge junction. The merge controller accepts block occupancy information from block control system 1 as well as measurements of the distances from the merge junction to approaching vehicles on merging right-of-way lanes 27 and 28 as determined by wayside reflectometer 30A cooperating with transponder 33, located in vehicle 31, and from wayside reflectometer 30B cooperating with transponder 34 located in vehicle 32. Several vehicles on each lane are tracked simultaneously as necessary to establish uninterrupted flow of merging vehicles. Operations performed by the merge controller are illustrated in FIG. 8.

As approaching vehicles are identified, a priority is accorded to each vehicle with respect to the order of its passage through the merge junction. Safe headway conditions for vehicles in the same lane (including right of way leaving the merge junction) are maintained, as are corresponding conditions for vehicles in merging lanes. A check is made for the presence of vehicles with inoperative transponders. Based on the above determinations, the merge controller commands appropriate status for all blocks in the merge region. Possible loop antenna energization states are analogous to states as described for protection against collision in vehicle follower situations. States depend on the positions of vehicles, within the blocks of the merge region and beyond, as determined jointly by presence detector operation and by wayside reflectometer measurements. A loop antenna energization signal of frequency $f_1$, corresponding to safe-to-proceed status, is imposed when no vehicle is present in the next downstream block and when no merge conflict exists. A loop antenna is unenergized, corresponding to unsafe-to-proceed (revocable) status, when a vehicle occupies the next downstream block, or when the block spanned by the loop antenna is occupied by more than one vehicle, and when no merge conflict exists. A loop antenna energization signal of frequency $f_2$ corresponding to unsafe-to-proceed (nonrevocable) status is imposed when a vehicle in the opposite branch poses a merge conflict or when the next downstream block is occupied by more than one vehicle.

I claim:
1. A collision avoidance system, for vehicles operating over a right of way, comprising:
   block control means that register vehicle occupancy of a plurality of zones along the right of way and impose revocable restrictions on the operation of a trailing vehicle in a selected number of zones behind a zone occupied by a leading vehicle to protect said trailing vehicle against collision with said leading vehicle;
   vehicle control means to measure the distance between said trailing vehicle and said leading vehicle, and further comprising means to restrict the operation of said trailing vehicle in accordance with the measured distance between said trailing vehicle and said leading vehicle to protect said trailing vehicle against collision with said leading vehicle;
   means to revoke said revocable restrictions imposed by said block control means with respect to operation of said trailing vehicle when said trailing vehicle is protected against collision in accordance with said measured distance between said trailing vehicle and said leading vehicle, said vehicle control means located in each said vehicle remaining continuously invoked.
2. A collision avoidance system as set forth in claim 1, wherein the means to measure the distance between said trailing vehicle and said leading vehicle comprise:
   reflectometer means within said trailing vehicle to generate a first electromagnetic signal, transmit said first signal to said leading vehicle, receive a second signal transmitted from said leading vehicle in response to said first signal and determine said measured distance by measuring the elapsed time between transmission of said first signal and receipt of said second signal in said trailing vehicle;
   transmission line means to carry said first and second signals along the right of way;
   transponder means to receive said first signal in said leading vehicle and transmit said second signal from said leading vehicle to said trailing vehicle, said second signal having a specified time relationship with said first signal;

coupler means for transferring signals between said reflectometer means and said transmission line means, and coupler means for transferring signals between said transponder means and said transmission line means.

3. A collision avoidance system as set forth in claim 2, wherein the block control means, additionally, register occupancy by more than one vehicle within a zone and impose nonrevocable restrictions on the operation of said trailing vehicle in a selected number of zones behind a zone occupied jointly by said leading vehicle and a third vehicle, to protect said trailing vehicle against collision with said leading vehicle when said leading vehicle is inoperative with respect to said transponder means and is intermediate between said trailing vehicle and said third vehicle.

4. A collision avoidance system as set forth in claim 3, wherein, additionally, said revocable restrictions are revoked only when the measured distance between said trailing vehicle and said leading vehicle is consistent with a causal relationship between said revocable restrictions and said leading vehicle.

5. A collision avoidance system as set forth in claim 4, wherein, additionally, said revocable restrictions are imposed on the operation of vehicles within a zone occupied by more than one vehicle.

6. A collision avoidance system as set forth in claim 5, wherein, additionally, startup restrictions are imposed on a vehicle that has stopped on the right of way, said startup restrictions being in accordance with the measured distance between the stopped vehicle and said leading vehicle.

7. In a collision avoidance system for vehicles operating over a right of way, the combination comprising:

block control means that register vehicle occupancy of a plurality of zones within specified segments of right of way and impose restrictions on the operation of vehicles within said zones, said right of way comprising separate lanes that join to form a merge junction;

interacting wayside means and vehicle mounted means to measure the distances between a defined point of right-of-way juncture and a plurality of merging vehicles which approach said merge junction on said separate lanes, and merge controller means which govern block control restrictions on said separate lanes in accordance with said measured distances between said defined point of right-of-way juncture and said merging vehicles, to prevent collision between merging vehicles, said merge controller means further determining zone occupancy status of said merging vehicles from said measured distances, said merge controller means further comparing said zone occupancy status, determined from said measured distances with said registered vehicle occupancy status, to identify malfunctioning distance measurement means and to govern block control restrictions accordingly to prevent collision between merging vehicles.

8. In a collision avoidance system, the combination as set forth in claim 7, wherein said merge controller means govern block control restrictions within a merge region to prevent collision between vehicles operating in a same lane, said merge region comprising said separate lanes that join to form said merge junction and further comprising a lane departing from said merge junction.

9. In a collision avoidance system, the combination as set forth in claim 8, wherein the means to measure the distance between said defined point of right-of-way lane juncture and a merging vehicle comprise:

stationary reflectometer means, installed in the vicinity of the merge junction, to generate a first electromagnetic signal, transmit said first signal to a merging vehicle, receive a second signal transmitted from said merging vehicle in response to said first signal and determine said measured distance by measuring the elapsed time between transmission of said first signal and receipt of said second signal in said stationary reflectometer means;

transmission line means to carry said first and second signals along the right of way;

transponder means to receive said first signal in said merging vehicle and transmit said second signal from said merging vehicle to said stationary reflectometer means, said signal having a specified time relationship with said first signal;

coupler means for transferring signals between said reflectometer means and said transmission line means, and coupler means for transferring signals between said transponder means and said transmission line means.

10. In a collision avoidance system, the combination as set forth in claim 9, wherein separate reflectometer means measure distances between said defined point of lane juncture and merging vehicles in said separate lanes.

11. In a collision avoidance system, the combination as set forth in claim 10, wherein said merge controller means, additionally, identify vehicles that are inoperative with respect to transponder means and govern said block control restrictions accordingly to prevent collisions between merging vehicles.

* * * * *